(12) United States Patent
Masuda

(10) Patent No.: US 10,794,444 B2
(45) Date of Patent: Oct. 6, 2020

(54) WET BRAKE

(71) Applicant: KABUSHIKI KAISHA TOYOTA JIDOSHOKKI, Kariya-shi, Aichi-ken (JP)

(72) Inventor: Hideo Masuda, Aichi-ken (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 16 days.

(21) Appl. No.: 15/703,475

(22) Filed: Sep. 13, 2017

(65) Prior Publication Data

US 2018/0073586 A1    Mar. 15, 2018

(30) Foreign Application Priority Data

Sep. 15, 2016 (JP) ................... 2016-180491

(51) Int. Cl.
*F16D 65/853* (2006.01)
*F16D 55/40* (2006.01)
(Continued)

(52) U.S. Cl.
CPC ........... *F16D 65/853* (2013.01); *F16D 55/40* (2013.01); *F16D 65/128* (2013.01);
(Continued)

(58) Field of Classification Search
CPC .. F16D 2065/782; F16D 65/853; F16D 65/78; F16D 55/40
See application file for complete search history.

(56) References Cited

U.S. PATENT DOCUMENTS 4,269,289 A * 5/1981 Winkler ................. F16D 55/40
                                                188/264 D
4,280,609 A * 7/1981 Cruise .................... B60T 1/065
                                                188/218 XL
(Continued)

FOREIGN PATENT DOCUMENTS

DE      102011076035 A1 * 11/2012  ............. B60T 1/062
JP      55-107132 A      8/1980
(Continued)

OTHER PUBLICATIONS

Machine translation of JP 57-015149 (no date).*
Machine translation of JP 60-122033 (no date).*
Machine translation of DE 102011076035 (no date).*

*Primary Examiner* — Nicholas J Lane
(74) *Attorney, Agent, or Firm* — Sughrue Mion, PLLC

(57) ABSTRACT

A wet brake includes a housing, a rotator, a plurality of plates, a plurality of discs, and a piston. The rotator is rotatably disposed in the housing and cooperates with the housing to form therebetween a brake chamber into which cooling oil is forced to flow. The plates are disposed in the brake chamber and axially movably engaged with the housing. The discs are disposed alternatively with the plates in the brake chamber and axially movably engaged with the rotator. The piston is configured to push the plates and the discs. The housing has a cooling oil inlet and a cooling oil outlet that communicate with an inner peripheral region and an outer peripheral region of the brake chamber, respectively. An oil collecting passage is formed adjacent to an open end of the cooling oil outlet on a brake chamber side to communicate with the brake chamber and continues circumferentially.

1 Claim, 5 Drawing Sheets

(51) Int. Cl.
*F16D 65/12* (2006.01)
*F16D 121/06* (2012.01)
*F16D 65/02* (2006.01)
*F16D 65/78* (2006.01)
*F16D 121/04* (2012.01)

(52) U.S. Cl.
CPC ............... *F16D 2065/1332* (2013.01); *F16D 2065/1364* (2013.01); *F16D 2065/1372* (2013.01); *F16D 2065/788* (2013.01); *F16D 2065/789* (2013.01); *F16D 2121/04* (2013.01); *F16D 2121/06* (2013.01)

(56) References Cited

U.S. PATENT DOCUMENTS

| | | | |
|---|---|---|---|
| 4,562,902 A * | 1/1986 | Scibbe | B60T 1/062 188/106 P |
| 4,646,880 A * | 3/1987 | Logan | B60K 17/046 180/10 |
| 4,655,326 A * | 4/1987 | Osenbaugh | B60T 1/065 180/10 |
| 5,050,710 A * | 9/1991 | Bargfrede | B60T 1/065 188/264 E |
| 2013/0056289 A1 | 3/2013 | Shibukawa et al. | |
| 2013/0186714 A1* | 7/2013 | Hoots | F16D 65/853 188/71.5 |
| 2018/0274613 A1* | 9/2018 | Scheper | F16D 65/853 |

FOREIGN PATENT DOCUMENTS

| | | | |
|---|---|---|---|
| JP | 57015149 A * | 1/1982 | |
| JP | 60122033 U * | 8/1985 | |
| JP | 61-160634 A | 7/1986 | |
| JP | 01-131340 A | 5/1989 | |
| JP | 2001-193774 A | 7/2001 | |
| JP | 2003-004071 A | 1/2003 | |
| JP | 2013-053711 A | 3/2013 | |
| JP | 2015-504150 A | 2/2015 | |

* cited by examiner

WET BRAKE

BACKGROUND OF THE INVENTION

The present invention relates to a wet brake used in vehicles including industrial vehicles such as forklift trucks.

Japanese Unexamined Patent Application Publication No. 2001-193774 discloses a wet brake that is shown in FIG. 11 in an axial half sectional view. As shown in FIG. 11, the wet brake designated by 100 includes a housing 102, a rotary shaft 104, a plurality of plates 106, a plurality of discs 108, and a piston 110. The housing 102 is formed in a cylindrical shape. The rotary shaft 104 is rotatably disposed in the housing 102 and cooperates with the housing 102 to form a brake chamber between the housing 102 and the rotary shaft 104. The plates 106 are axially movably engaged with the housing 102. The discs 108 are axially movably engaged with the rotary shaft 104 and arranged alternatively with the plates 106. The piston 110 pushes the plates 106 and the discs 108. Cooling oil (brake fluid or brake oil) is forcibly flowed into the brake chamber by a hydraulic pump. The housing 102 has therethrough a cooling oil inlet 114 and a cooling oil outlet 116. The cooling oil inlet 114 and the cooling oil outlet 116 communicate with the inner peripheral region and the outer peripheral region of the brake chamber, respectively. Therefore, the cooling oil flows from the inner peripheral region to the outer peripheral region in the brake chamber.

The housing 102 of the wet brake 100 has a groove 118. The groove 118 extends axially in the housing 102 and connects the brake chamber and the cooling oil outlet 116, so that a part of the cooling oil flowing from the inner peripheral region to the outer peripheral region within the brake chamber flows into the cooling oil outlet 116 through the groove 118. However, the rest of the cooling oil flows through radial clearances between the housing 102 and the plates 106 and between the housing 102 and the discs 108, and then flows along the inner surface of the brake chamber to reach the groove 118 as indicated by the arrow y in FIG. 11. As a result, the cooling oil flowing to the outer peripheral region of the brake chamber cannot smoothly flow toward the cooling oil outlet 116 and fails to effectively cool down the plates 106 and the discs 108. Furthermore, the radial clearances between the housing 102 and the plates 106 and between the housing 102 and the discs 108 are narrow, so that the outer peripheries of the plates 106 and the discs 108 obstruct the axial flow of the cooling oil. Accordingly, although the plates 106 and the discs 108 near the cooling oil inlet 114 and the cooling oil outlet 116 are effectively cooled down by virtue of sufficient flow of the cooling oil, the plates 106 and the discs 108 away from the cooling oil inlet 114 and the cooling oil outlet 116 cannot be effectively cooled down due to insufficient flow of the cooling oil. Such low cooling effect is caused by uneven distribution of the cooling oil to the plates 106 and the discs 108. The present invention, which has been made in light of the above-described problems, is directed to providing a wet brake that enhances the cooling effect on the plates and the discs.

SUMMARY OF THE INVENTION

In accordance with one aspect of the present invention, there is provided a wet brake including a housing, a rotator, a plurality of plates, a plurality of discs, and a piston. The rotator is rotatably disposed in the housing and cooperates with the housing to form therebetween a brake chamber into which cooling oil is forced to flow. The plates are disposed in the brake chamber and axially movably engaged with the housing. The discs are disposed alternatively with the plates in the brake chamber and axially movably engaged with the rotator. The piston is configured to push the plates and the discs. The housing has a cooling oil inlet and a cooling oil outlet that communicate with an inner peripheral region and an outer peripheral region of the brake chamber, respectively. An oil collecting passage is formed adjacent to an open end of the cooling oil outlet on a brake chamber side to communicate with the brake chamber and continues circumferentially.

In accordance with one aspect of the present invention, there is provided a wet brake including a housing, a rotator, a plurality of plates, a plurality of discs, and a piston. The rotator is rotatably disposed in the housing and cooperates with the housing to form therebetween a brake chamber into which cooling oil is forced to flow. The plates are disposed in the brake chamber and axially movably engaged with the housing. The discs are disposed alternatively with the plates in the brake chamber and axially movably engaged with the rotator. The piston is configured to push the plates and the discs. The housing has a cooling oil inlet and a cooling oil outlet that communicate with an inner peripheral region and an outer peripheral region of the brake chamber, respectively. An outer passage is formed extending axially in an inner surface of the housing and/or through outer peripheries of the plates to permit the flow of the cooling oil from the outer peripheral region of the brake chamber.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe embodiments of the present invention with reference to the accompanying drawings.

First Embodiment

Figure 1:
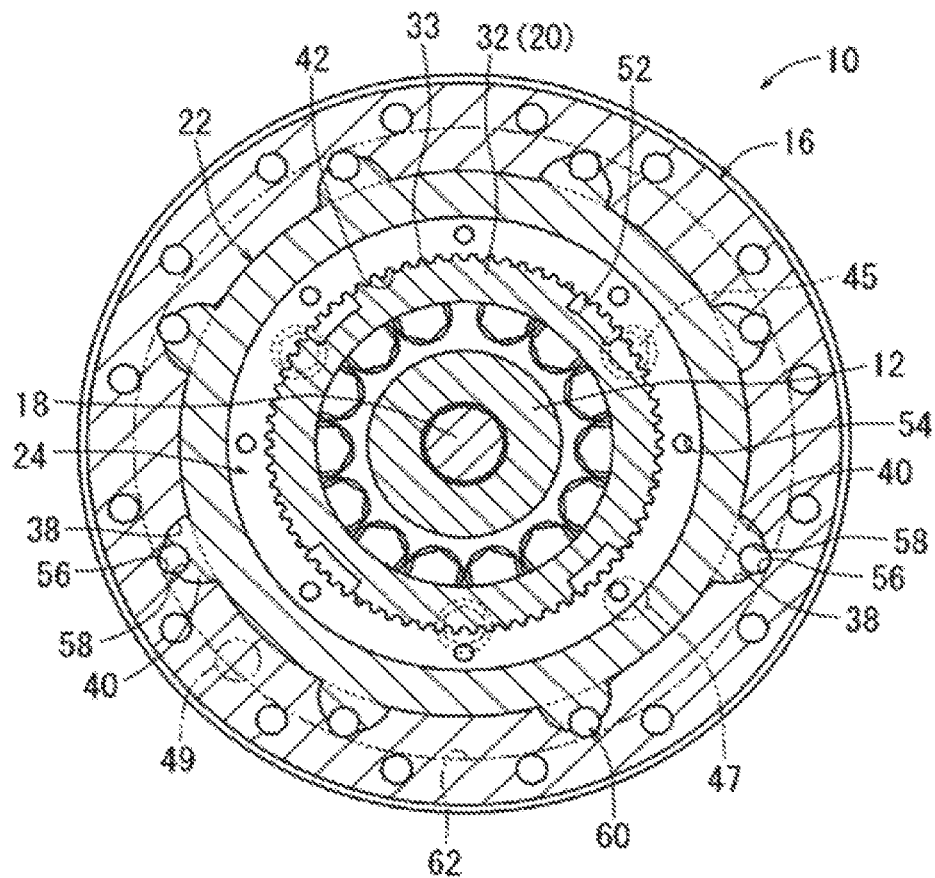
FIG. 1 is a radial sectional view of a wet brake according to a first embodiment of the present invention.
Figure 2:
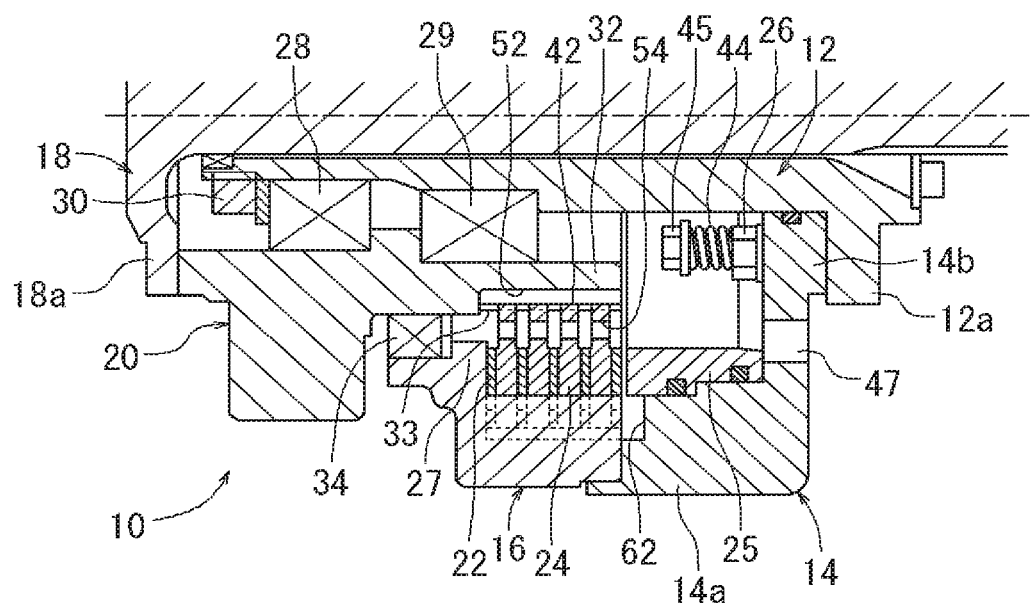
FIG. 2 is an axial half sectional view of the wet brake showing a cooling oil inlet.
Figure 3:
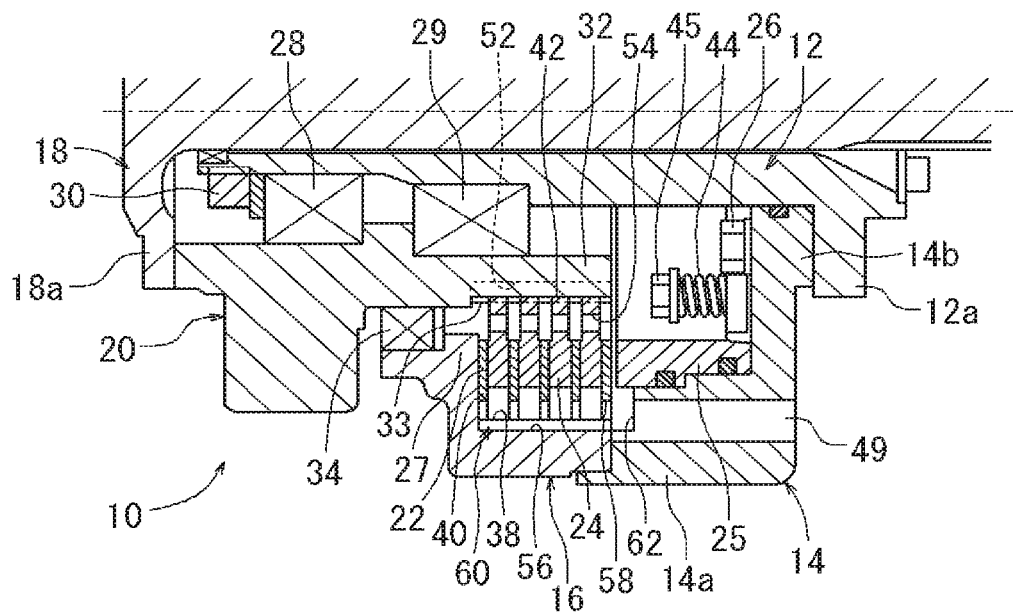
FIG. 3 is an axial half sectional view of the wet brake showing a cooling oil outlet.

FIG. 1 is a radial sectional view of a wet brake according to a first embodiment of the present invention. FIG. 2 is an axial half sectional view of the wet brake showing a cooling oil inlet. FIG. 3 is an axial half sectional view of the wet brake showing a cooling oil outlet. Referring to FIG. 2, the wet brake designated by 10 includes an axle housing 12, a piston housing 14, a brake housing 16, an axle shaft 18, a wheel hub 20, a plurality of plates 22, a plurality of discs 24, and a piston 25.

The axle housing 12 is formed in a hollow cylindrical shape and fixed to a side of a vehicle body (not shown). The axle housing 12 has at one end thereof (right end in FIG. 2) a flange 12a. The piston housing 14 is formed in an annular shape and has a peripheral wall 14a and an end wall 14b continuing from one end of the peripheral wall 14a. The end wall 14b is fitted in the axle housing 12 and fixed to the flange 12a by a plurality of bolts 26 (only one bolt is shown in FIG. 2).

The brake housing 16 is formed in annular shape and fixed to the peripheral wall 14a of the piston housing 14 by a plurality of bolts (not shown). The brake housing 16 has at one end thereof (left end in FIG. 2) a pressure receiving portion 27 of an annular shape. The axle housing 12, the piston housing 14 and the brake housing 16 cooperate to form the housing of the present invention.

The axle shaft 18 is a solid shaft and arranged in the axle housing 12 concentrically. The axle shaft 18 has at one end thereof (left end in FIG. 2) a flange 18a. The axle shaft 18 is driven to rotate by a drive source such as an electric motor (not shown).

The wheel hub 20 is formed in a cylindrical shape and fixed to the flange 18a of the axle shaft 18 by a plurality of bolts (not shown) with the axle housing 12 inserted through the wheel hub 20 concentrically. The wheel hub 20 is rotatably supported by the axle housing 12 via bearings 28, 29. The bearings 28, 29 are fixed to the axle housing 12 by a nut 30. Though not shown in the drawings, a wheel is fixed to the wheel hub 20 by a plurality of bolts.

The wheel hub 20 has a brake hub 32. The brake hub 32 extends toward the inside of the brake housing 16. The brake hub 32 has an external spline 33 thereon (FIG. 1). The brake hub 32 and the brake housing 16 cooperate to interpose an oil seal 34 between the base end of the brake hub 32 and the end of the brake housing 16 (left end in FIG. 2) to seal therebetween. This configuration forms a brake chamber between the brake housing 16 and the brake hub 32 of the wheel hub 20. The brake chamber communicates with the internal space of the piston housing 14. The axle shaft 18 and the wheel hub 20 cooperate to form the rotator of the present invention.

The cylindrical brake housing 16 has on the inner surface thereof a plurality of concave portions 38, for example eight concave portions (FIG. 1). The concave portions 38 are arranged at regular intervals in the circumferential direction of the brake housing 16. The concave portions 38 are provided, for example, by grooves each having a semicircular section and extending axially (FIG. 3).

As shown in FIGS. 1 and 2, the plurality of plates 22, for example five plates according to this embodiment, is formed substantially in the same annular shape. Each plate 22 has an outer diameter that is barely large enough to be fitted in the brake housing 16 and an inner diameter that is approximately equal to the inner diameter of the pressure receiving portion 27. Each plate 22 is formed with as many convex portions 40 as the concave portions 38 on the outer periphery of the plate 22. The convex portions 40 are arranged circumferentially at regular intervals. Each convex portion 40 is formed in a semicircular shape so as to have barely enough space to be fitted in the concave portion 38.

The plates 22 are axially movably fitted in the brake housing 16, so that the convex portions 40 are axially movably fitted in the concave portions 38 of the brake housing 16, but not rotatable relative to the concave portions 38 of the brake housing 16. The concave portions 38 and the convex portions 40 cooperate to form the detents of the present invention.

The plurality of discs 24, for example four discs according to this embodiment, is formed substantially in the same annular shape. Each disc 24 has an outer diameter that is barely large enough to be fitted in the brake housing 16 (FIG. 2). Each disc 24 has on the inner periphery thereof an internal spline 42 that is barely large enough to be fitted in the external spline 33 of the brake hub 32.

The discs 24 are axially movably fitted in the brake hub 32. The internal splines 42 of the discs 24 are axially movably fitted in the external spline 33 of the brake hub 32, but not rotatable relative to the external spline 33 of the brake hub 32. Each disc 24 is arranged between any two adjacent plates 22 such that the discs 24 are arranged alternatively with the plates 22 (FIG. 2).

The plates 22 and the discs 24 are radially centered and aligned because the plates 22 and the discs 24 have barely enough space to be fitted in the brake housing 16. Each plate 22 has thereon a friction material (not shown), for example a paper type material, which is frictionally engaged with each disc 24.

As shown in FIG. 2, the piston 25 is axially movably fitted in the peripheral wall 14a of the piston housing 14. The piston 25 is formed in an annular shape and pushes the plates 22 and the discs 24 against the pressure receiving portion 27 of the brake housing 16. The piston 25 is urged away from the pressure receiving portion 27 by a plurality of return springs 44 for releasing the brake. The return springs 44 are fastened to the end wall 14b of the piston housing 14 by bolts 45, respectively. In the illustrated embodiment, the return springs 44 are arranged in the piston housing 14 circumferentially at regular intervals. For example, three coil springs are provided as the return springs 44 in this embodiment.

Though not shown in any drawings, the piston 25 has on the inner periphery thereof protruding portions for the insertion of the bolts 45. The piston 25 has therein an oil pressure chamber on the piston housing 14 side, and oil pressure is generated in the chamber in response to brake operation by a vehicle driver. The oil pressure generated in the chamber pushes the piston 25 against the urging force of the return springs 44. The piston 25 pushes the plates 22 and the discs 24 toward the pressure receiving portion 27 of the brake housing 16, so that the plates 22 and the discs 24 are frictionally engaged with each other, thereby generating braking force. When the oil pressure is released from the oil pressure chamber by the release of the brake, the piston 25 is pulled back by the urging force of the return springs 44, and the plates 22 and the discs 24 are released from the pressure, accordingly.

The piston housing 14 has therethrough a cooling oil inlet 47 (FIG. 2) and a cooling oil outlet 49 (FIG. 3) through which cooling oil flows in and out of the brake chamber, respectively. Specifically as shown in FIG. 2, the cooling oil inlet 47 is formed through the end wall 14b of the piston housing 14 so as to communicate with the inner peripheral region of the brake chamber through the inside of the piston 25. As shown in FIG. 3, the cooling oil outlet 49 is formed through the peripheral wall 14a of the piston housing 14 so as to communicate with the outer peripheral region of the brake chamber. The brake chamber is connected to a brake cooling circuit including a hydraulic pump (not shown)

through the cooling oil inlet 47 and the cooling oil outlet 49, and the hydraulic pump forces the cooling oil to flow to the brake cooling circuit.

Figure 4:
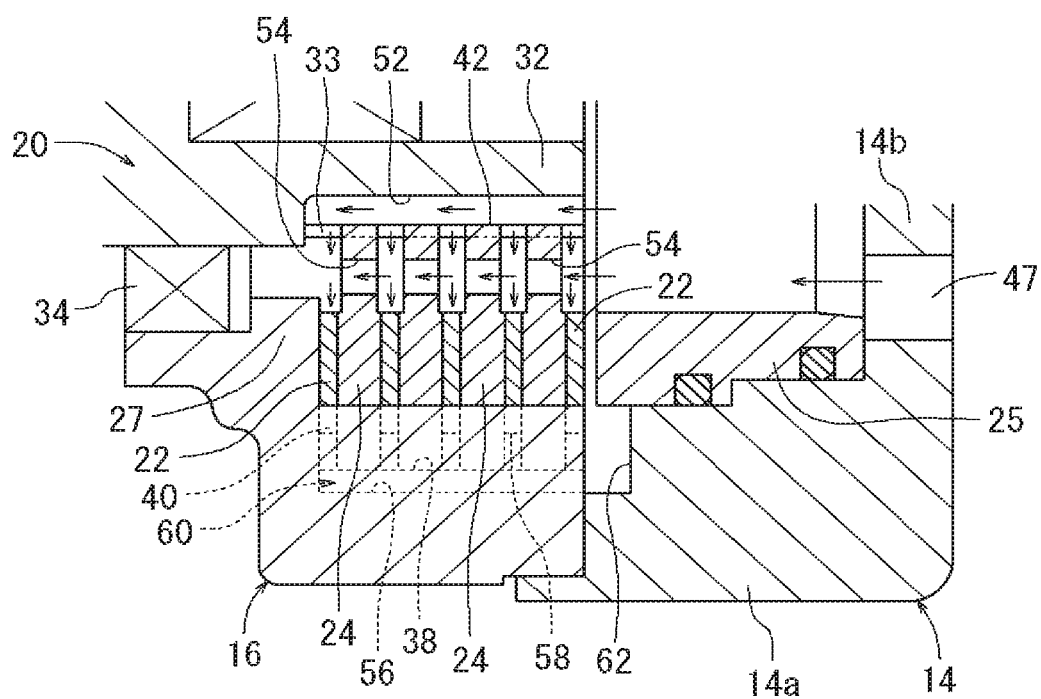
FIG. 4 is a sectional view showing a positional relationship between a brake housing and discs.

To distribute the cooling oil across all the plates 22 and the discs 24, an upstream passage, which serves as the inner passage of the present invention, is formed in the inner peripheral region of the brake chamber. As shown in FIG. 1, the brake hub 32 of the wheel hub 20 has on the outer surface thereof a plurality of grooves 52. For example, four grooves are shown in FIG. 1. The grooves 52 are formed circumferentially at regular intervals. Each groove 52 has for example a circular arc shape in section, and extends axially along the brake hub 32 (FIG. 4). FIG. 4 is a sectional view showing a positional relationship between the brake housing 16 and the discs 24.

Each disc 24 has a plurality of holes 54. For example, eight holes are shown in FIG. 1. The holes 54 are formed circumferentially at regular intervals in the inner periphery of the disc 24. For example, each hole 54 is formed in a circular shape. As shown in FIG. 4, the holes 54 of the discs 24 are aligned in the axial direction of the discs 24. The holes 54 of each disc 24 are located radially inward of the inner edge of each plate 22. The grooves 52 and the holes 54 cooperate to form the upstream passage. The flow of the cooling oil in the upstream passage is indicated by arrows in FIG. 4.

Figure 5:
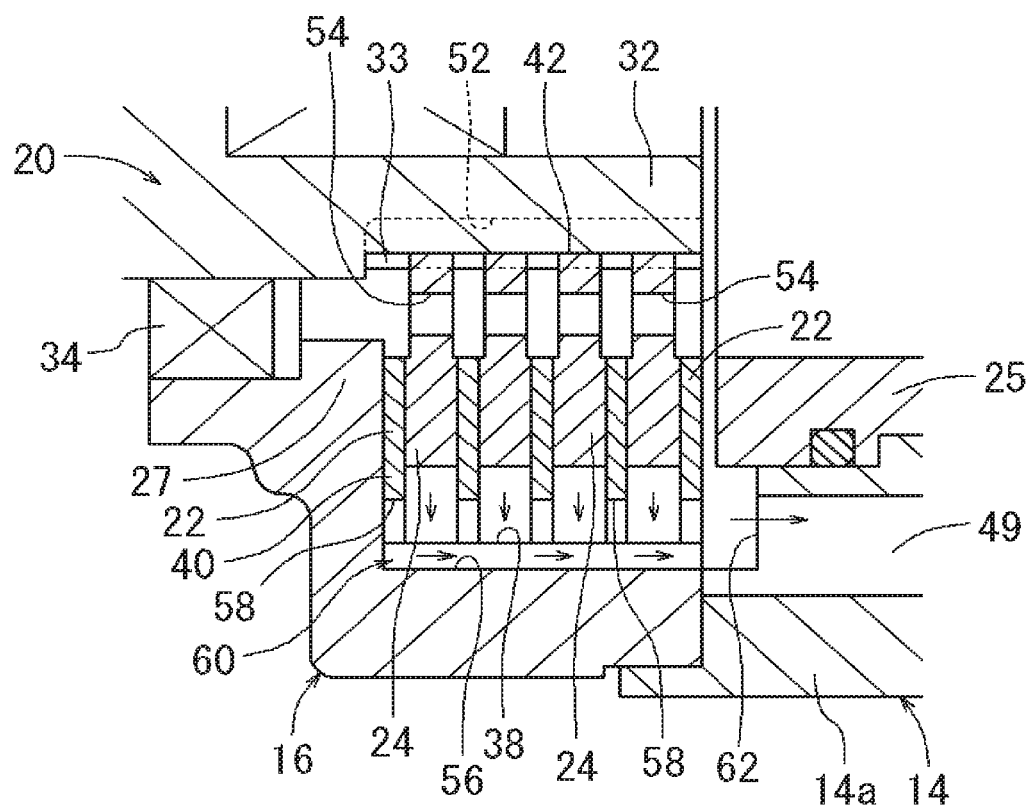
FIG. 5 is a sectional view showing a positional relationship between the brake housing and plates.

To discharge the cooling oil from the cooling oil outlet 49 through the clearances between the plates 22 and the discs 24, a downstream passage is formed in the outer peripheral region of the brake chamber. The downstream passage serves as the outer passage of the present invention. As shown in FIG. 1, each concave portion 38 of the brake housing 16 has in the bottom thereof a groove 56. For example, the groove 56 has a semicircular shape in section and extends in the axial direction of the brake housing 16 (FIG. 5). FIG. 5 is a sectional view showing a positional relationship between the brake housing 16 and the plates 22, and FIG. 6 is a sectional view showing the downstream passage.

Figure 6:
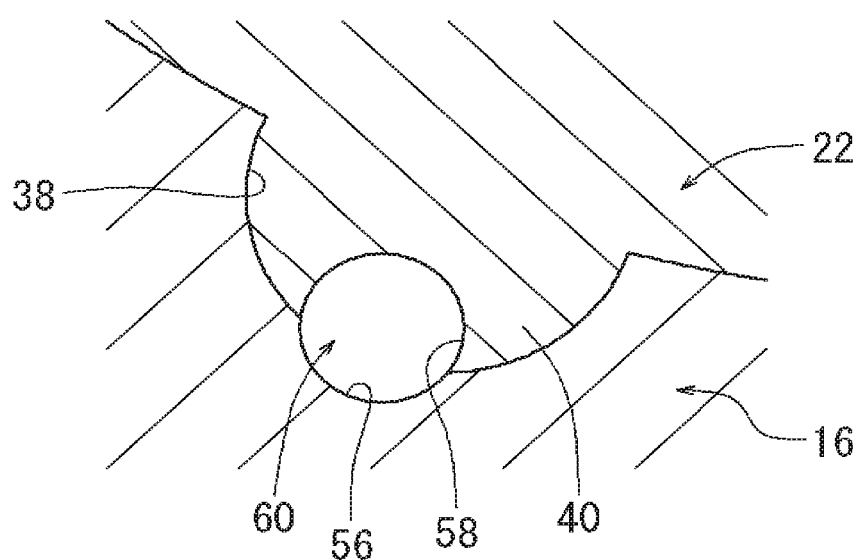
FIG. 6 is a sectional view showing a downstream passage.

As shown in FIG. 6, each convex portion 40 of the plates 22 has at the edge thereof a recess 58 as a cutout. For example, the recess 58 has a semicircular shape. The recesses 58 of each plate 22 are disposed radially outward of the outer periphery of the plate 22 (FIG. 5) and correspond in position to the grooves 56 of the brake housing 16, respectively. The recesses 58 of the respective plates 22 and their corresponding grooves 56 of the brake housing 16 cooperate to form passages 60 of a circular shape in section. The passages 60 form the downstream passage and are arranged at positions that are not likely to obstruct the brake housing 16 and its surroundings. The flow of the cooling oil in the passages 60 as the downstream passage is indicated by arrows in FIG. 5.

As shown in FIG. 5, an annular groove 62 is formed by the inner surface of the peripheral wall 14a of the piston housing 14 and an end face of the piston housing 14 on the brake housing 16 side (as indicated by a two-dot chain line in FIG. 1). The annular groove 62 continues circumferentially 360 degrees, and has for example a square shape in section. The annular groove 62 is formed adjacent to an open end of the cooling oil outlet 49 on the brake chamber side and communicates with the brake chamber. The annular groove 62 communicates with the passages 60 as the downstream passage and serves as an oil collecting passage that collects and delivers the cooling oil flowed through the brake chamber to the cooling oil outlet 49.

In the wet brake 10 in which the cooling oil supplied by the hydraulic pump flows into the brake chamber from the cooling oil inlet 47 through the internal space of the piston 25, the cooling oil passes through the grooves 52 of the brake hub 32 of the wheel hub 20 and then the holes 54 of the discs 24. Accordingly, the cooling oil is smoothly distributed from the cooling oil inlet 47 to the pressure receiving portion 27 (as indicated by the arrows in FIG. 4), so that the cooling oil is distributed throughout all the plates 22 and the discs 24 and evenly across the spaces between the plates 22 and the discs 24.

Then, the cooling oil flows radially outward of the respective spaces between the plates 22 and the discs 24 by the pumping pressure from the hydraulic pump and the centrifugal force generated by the rotation of the wheel hub 20 so as to cool down the plates 22 and the discs 24. The cooling oil flowing out between the plates 22 and the discs 24 then flows into the respective spaces between any two adjacent plates 22.

Then, the cooling oil flows from the spaces between the plates 22 toward the annular groove 62 through the passages 60 as the downstream passage formed by the grooves 56 and the recesses 58 of the plates 22 as indicated by the arrows in FIG. 5, so that the cooling oil is smoothly distributed from the pressure receiving portion 27 to the annular groove 62 by the downstream passage. The cooling oil flowed out from the passages 60 is collected in the annular groove 62 and returns to the brake cooling circuit through the cooling oil outlet 49.

In the wet brake 10 in which the cooling oil flowed from the outer peripheral region to the inner peripheral region in the brake chamber, the cooling oil smoothly flows toward the cooling oil outlet 49 through the annular groove 62 formed at the open end of the cooling oil outlet 49 on the brake chamber side. Therefore, the plates 22 and the discs 24 are cooled down effectively.

The cooling oil flowed from the inner peripheral region to the outer peripheral region in the brake chamber through the respective spaces between the plates 22 and the discs 24 then flows out to the annular groove 62 through the passages 60 smoothly. Therefore, the plates 22 and the discs 24 are cooled down more effectively.

The passages 60 are arranged radially outward of the outer peripheries of the discs 24, so that the discs 24 do not obstruct the cooling oil flowing through the passages 60.

Each passage 60 is formed by the groove 56 of the brake housing 16 and its associated recesses 58 of the respective plates 22. This configuration enables to increase the sectional area of the passage 60 as compared with a case that the passage 60 is formed by the groove 56 or the recesses 58 only.

Even distribution of the cooling oil throughout all the plates 22 and the discs 24 operates to reduce the heat influence on the friction materials. This configuration enhances the durability of the wet brake 10 while producing more stable braking force.

Providing the upstream passage (the grooves 52 and the holes 54) and the downstream passage (the passages 60) operates to reduce the supply pressure of the cooling oil by the hydraulic pump, so that the wet brake 10 does not need a seal member, such as the oil seal 34, with high pressure resistance and a high performing hydraulic pump, with the result that effective cost saving is achieved.

Forming each passage 60 by the concave portion 38 of the brake housing 16 and its associated convex portions 40 of the plates 22 improves the flow of the cooling oil without changing the basic structures of the brake housing 16 and the plates 22. Additionally, this configuration allows the number of the detents formed by the concave portions 38 and the convex portions 40 to be increased or decreased as required.

Second Embodiment

Figure 7:
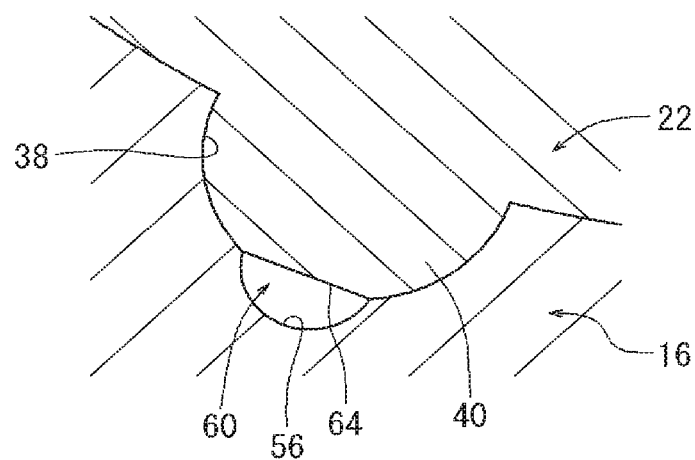
FIG. 7 is a sectional view showing a downstream passage according to a second embodiment of the present invention.

Referring to FIG. 7, there is shown a second embodiment of the present invention, which differs from the first embodiment in the configuration of the passages 60 as the downstream passage. In the second embodiment, as shown in FIG. 7, each passage 60 is formed by the groove 56 and recesses 64, which is formed as cutouts by the cut of the tops of the convex portions 40 associated with the groove 56.

Third Embodiment

Figure 8:
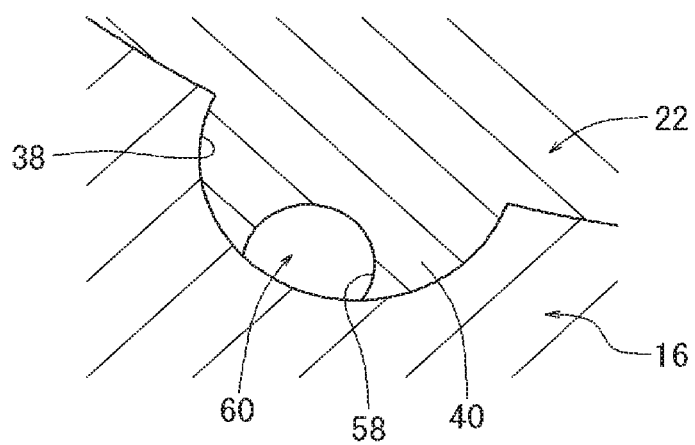
FIG. 8 is a sectional view showing a downstream passage according to a third embodiment of the present invention.

Referring to FIG. 8, there is shown a third embodiment of the present invention, which differs from the first embodiment in the configuration of the passages 60 as the downstream passage. In the third embodiment, as shown in FIG. 8, each concave portion 38 of the brake housing 16 is formed without the groove 56.

Fourth Embodiment

Figure 9:
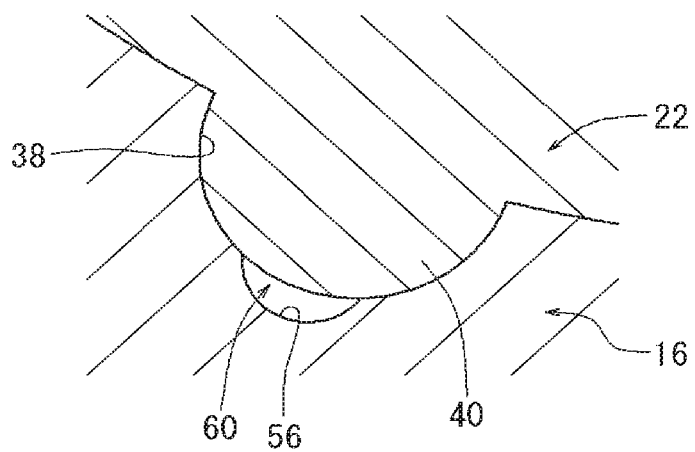
FIG. 9 is a sectional view showing a downstream passage according to a fourth embodiment of the present invention.

Referring to FIG. 9, there is shown a fourth embodiment of the present invention, which differs from the first embodiment in the configuration of the passages 60 as the downstream passage. In the fourth embodiment, as shown in FIG. 9, the convex portions 40 of each plate 22 are formed without the recesses 58.

Fifth Embodiment

Figure 10:
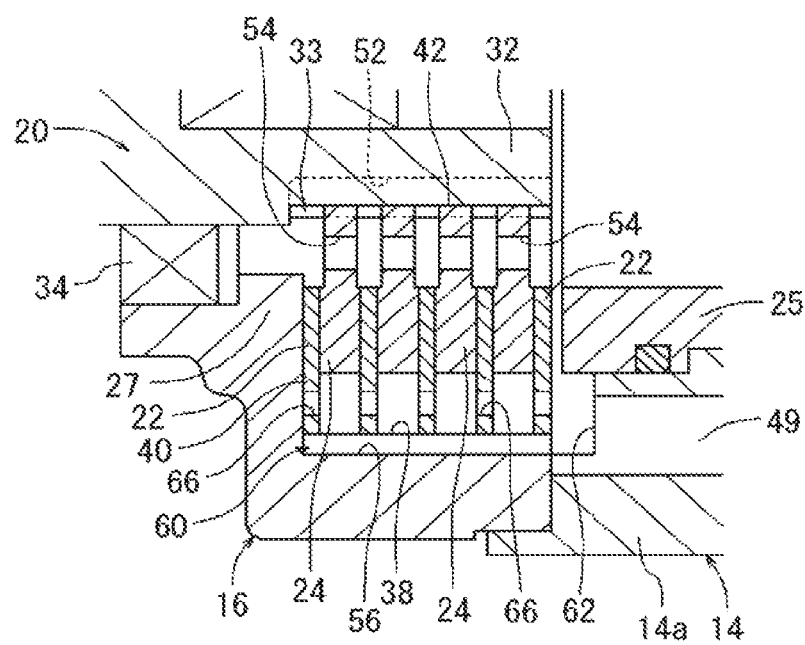
FIG. 10 is a sectional view showing a positional relationship between the brake housing and the plates according to a fifth embodiment of the present invention.
Figure 11:
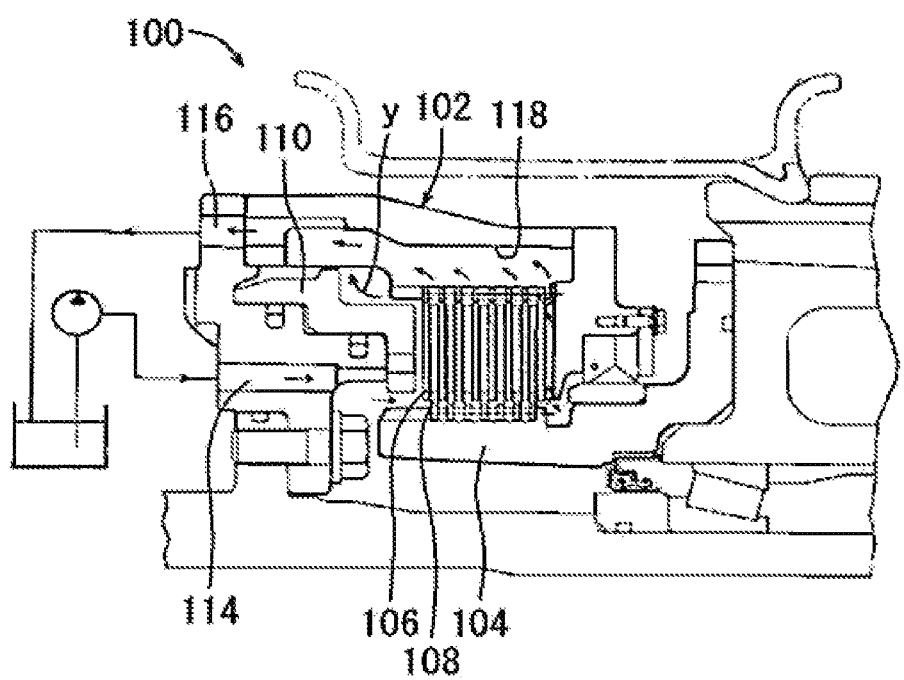
FIG. 11 is an axial half sectional view of a wet brake according to the background art.

Referring to FIG. 10, there is shown a fifth embodiment of the present invention, which differs from the first embodiment in the configuration of the passages 60 as the downstream passage. In the fifth embodiment as shown in FIG. 10, each convex portion 40 of the plates 22 for example has in the center thereof a hole 66 of a round shape. Though the recess 58 is removed from each convex portion 40 in FIG. 10, it needs not necessarily be removed. The grooves 56 of the brake housing 16 may be removed.

Other Embodiments

Although the specific embodiments have been described above, the present invention is not limited thereto, and the invention may appropriately be modified within the gist of the present invention. For example, the downstream passage may be formed by one passage 60. Each groove 56 of the brake housing 16 is formed in the concave portion 38 of the brake housing 16, but not limited thereto. The groove 56 may be formed at any position in the inner surface of the brake housing 16 as long as the groove 56 faces the outer peripheries of the plates 22. The recesses 58 are respectively formed at the edges of the convex portions 40 of the plates 22, but not limited thereto. The recesses 58 of the plates 22 may be formed at any positions at the edges of the plates 22 as long as the recesses 58 face the inner surface of the brake housing 16. The grooves 56 need not necessarily correspond in position or numbers to the recesses 58 of each plate 22. Instead of the detents, each plate 22 may be engaged with the brake housing 16 by a dowel pin. The shapes and numbers of concave portions 38 and convex portions 40 serving as the detents may be changed as needed as long as the concave portions 38 and the convex portions 40 are engaged with each other. Either the grooves 52 of the brake hub 32 of the wheel hub 20 or the holes 54 of the discs 24 may be removed. At least one groove 52 is necessary, and two or more grooves 52 may be provided. At least one hole 54 is necessary, and two or more holes 54 may be provided. Each hole 54 may be replaced with a groove formed in the inner edge of each disc 24.

What is claimed is:

1. A wet brake comprising:
   a housing having semicircular concave portions formed on an inner surface of the housing;
   a rotator rotatably disposed in the housing and cooperating with the housing to form therebetween a brake chamber into which cooling oil is forced to flow;
   a plurality of plates disposed in the brake chamber and axially movably engaged with the housing, wherein the plurality of plates each have semicircular convex portions that fit in the semicircular concave portions of the housing;
   a plurality of discs disposed alternately with the plurality of plates in the brake chamber and axially movably engaged with the rotator; and
   a piston configured to push the plates and the discs, wherein
   the housing has a cooling oil inlet that communicates with an inner peripheral region of the brake chamber and a cooling oil outlet that communicates with an outer peripheral region of the brake chamber,
   an oil collecting passage is formed adjacent to an open end of the cooling, oil outlet on a brake chamber side to communicate with the brake chamber and continues circumferentially, and
   semicircular grooves are formed on inner peripheral surfaces of the semicircular concave portions of the housing,
   straight cut portions are formed on the outer peripheral surfaces of the semicircular convex portions, and
   outer passages extend axially in the housing, wherein the outer passages are defined by the semicircular grooves on the inner peripheral surfaces of the semicircular concave portions of the housing and the straight cut portions on the outer peripheral surfaces of the semicircular convex portions of the plates that face each other, wherein each of the straight cut portions extends in a single straight line between opposing ends of the semicircular grooves.

* * * * *